(12) United States Patent
Ebata et al.

(10) Patent No.: US 9,869,518 B2
(45) Date of Patent: Jan. 16, 2018

(54) CHEMICAL HEAT STORAGE DEVICE

(71) Applicant: AISIN SEIKI KABUSHIKI KAISHA, Kariya-shi, Aichi-ken (JP)

(72) Inventors: Yusuke Ebata, Seto (JP); Osamu Tsubouchi, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 99 days.

(21) Appl. No.: 14/903,895

(22) PCT Filed: Jun. 19, 2014

(86) PCT No.: PCT/JP2014/066244
§ 371 (c)(1),
(2) Date: Jan. 8, 2016

(87) PCT Pub. No.: WO2015/005085
PCT Pub. Date: Jan. 15, 2015

(65) Prior Publication Data
US 2016/0169590 A1    Jun. 16, 2016

(30) Foreign Application Priority Data

Jul. 12, 2013    (JP) .................................. 2013-146397

(51) Int. Cl.
  *B60H 1/00* (2006.01)
  *F28D 11/02* (2006.01)
  (Continued)

(52) U.S. Cl.
  CPC ............ *F28D 11/02* (2013.01); *F01N 3/0205* (2013.01); *F01N 3/20* (2013.01); *F01N 3/2006* (2013.01);
  (Continued)

(58) Field of Classification Search
  CPC ...... F28D 11/02; F28D 20/003; F01N 3/0205; F01N 3/20; F01N 3/2006; F01N 5/02;
  (Continued)

(56) References Cited

U.S. PATENT DOCUMENTS 3,253,400 A * 5/1966 Hass .................. B01D 53/9431
                                              422/176
3,481,144 A * 12/1969 Morrell .................. F01N 3/0205
                                              123/575

(Continued)

FOREIGN PATENT DOCUMENTS

DE    2931942 A1    2/1981
FR    2571838 A1 *  4/1986 .............. F28D 11/02
(Continued)

OTHER PUBLICATIONS

FR 2571838 A1 translation.*
(Continued)

*Primary Examiner* — Len Tran
*Assistant Examiner* — Gordon Jones
(74) *Attorney, Agent, or Firm* — Buchanan Ingersoll & Rooney PC

(57) ABSTRACT

A chemical heat storage device includes a reaction vessel accommodating a heat storage material, a heat exchange flow path provided so that a heat-exchange fluid flows along an outer surface of the reaction vessel, and the chemical heat storage device being configured in such a manner that the reaction vessel is rotated and the heat storage material is agitated, by a flow force of the heat-exchange fluid.

11 Claims, 5 Drawing Sheets

(51) Int. Cl.
| | | |
|---|---|---|
| *F01N 5/02* | (2006.01) | |
| *F01N 3/20* | (2006.01) | |
| *F01N 5/04* | (2006.01) | |
| *F28D 20/00* | (2006.01) | |
| *F01N 3/02* | (2006.01) | |
| *F28F 1/18* | (2006.01) | |
| *F28F 5/02* | (2006.01) | |

(52) U.S. Cl.
CPC ............... *F01N 5/02* (2013.01); *F01N 5/04* (2013.01); *F28D 20/003* (2013.01); *F28F 1/18* (2013.01); *F28F 5/02* (2013.01); *F01N 2240/10* (2013.01); *F01N 2240/12* (2013.01); *F01N 2290/04* (2013.01); *Y02E 60/142* (2013.01); *Y02T 10/16* (2013.01); *Y02T 10/26* (2013.01)

(58) Field of Classification Search
CPC .... F01N 5/04; F01N 2240/12; F01N 2240/10; F01N 2290/04; F28F 1/18; F28F 5/02; Y02E 60/142; Y02T 10/16; Y02T 10/26
See application file for complete search history.

(56) References Cited

U.S. PATENT DOCUMENTS

| | | | | |
|---|---|---|---|---|
| 3,563,710 A | * | 2/1971 | Dew | ............ B01F 7/02 159/11.3 |
| 3,613,777 A | * | 10/1971 | Nara | ............ F28D 11/02 165/86 |
| 4,271,682 A | * | 6/1981 | Seki | ............ F28D 11/02 62/354 |
| 2002/0189277 A1 | * | 12/2002 | Takao | ............ B67D 1/0012 62/393 |
| 2005/0016200 A1 | | 1/2005 | Takao et al. | |

FOREIGN PATENT DOCUMENTS

| | | |
|---|---|---|
| JP | 55-43330 A | 3/1980 |
| JP | 58-32279 U | 3/1983 |
| JP | 61-294113 A | 12/1986 |
| JP | 5-248728 A | 9/1993 |
| JP | 6-96114 B2 | 11/1994 |
| JP | 2001-317887 A1 | 11/2001 |
| JP | 2010-216772 A | 9/2010 |
| JP | 2012-097996 A | 5/2012 |
| WO | WO 01/38811 A1 | 5/2011 |

OTHER PUBLICATIONS

International Search Report (PCT/ISA/210) dated Sep. 9, 2014, by the Japanese Patent Office as the International Searching Authority for International Application No. PCT/JP2014/066244.

Written Opinion (PCT/ISA/237) dated Sep. 9, 2014, by the Japanese Patent Office as the International Searching Authority for International Application No. PCT/JP2014/066244.

* cited by examiner

Second modification

Third modification
CHEMICAL HEAT STORAGE DEVICE

TECHNICAL FIELD

This invention relates to a chemical heat storage device.

BACKGROUND ART

Conventionally, a chemical heat storage device using a heat storage material is known. Such a chemical heat storage device is disclosed in JPH5-248728A, for example.

The above-mentioned JPH5-248728A discloses a chemical heat storage type heat pump (a chemical heat storage device) provided with a reactor accommodating a solid particle (a heat storage material) which reacts with water vapor, an evaporative condenser connected to the reactor via a reactant gas supply pipe and accommodating water formed by condensed water vapor, a pair of heat medium flow paths which are respectively provided around the reactor and around the evaporative condenser and through which heat medium flows, and a rotation shaft drive portion. The chemical heat storage type heat pump is configured in such a manner that the reactor, the evaporative condenser and the reactant gas supply pipe are rotated about the rotation shaft by drive power of the rotation shaft drive portion, thereby moving and flowing (agitating) the solid particle that is in the reactor.

DOCUMENT OF PRIOR ART

Patent Document

Patent document 1: JPH5-248728A

OVERVIEW OF INVENTION

Problem to be Solved by Invention

However, the chemical heat storage type heat pump of JPH5-248728A is configured to rotate the reactor with the drive power of the rotation shaft drive portion, and thus, is necessarily provided with the rotation shaft drive portion for rotating the reactor in order to move and flow the solid particle that is in the reactor. Accordingly, there is a problem that an additional electric power is needed to drive the rotation shaft drive portion.

This invention is made to solve a problem such as an above-mentioned problem, and one of purposes of this invention is to provide a chemical heat storage device that can agitate a heat storage material by moving a reaction vessel even though a drive portion for moving the reactor vessel is not provided.

Means for Solving Problem

To achieve the above-mentioned purpose, a chemical heat storage device according to an aspect of the invention includes a reaction vessel accommodating a heat storage material and a heat exchange flow path provided so that a heat-exchange fluid flows along an outer surface of the reaction vessel, and the chemical heat storage device is configured in such a manner that the reaction vessel is moved and the heat storage material is agitated, by a flow force of the heat-exchange fluid.

At the chemical heat storage device according to the above-mentioned aspect of the invention, the reaction vessel is moved by the flow force of the heat-exchange fluid, and thus the heat storage material is agitated. Accordingly, without providing a drive portion for moving the reaction vessel, the reaction vessel can be moved by the flow force of the heat-exchange fluid and the agitation of the heat storage material can be performed. As there is no need to provide the drive portion, the number of parts and components can be reduced and a configuration of the device can be simplified, and a size of the chemical heat storage device can be reduced, accordingly. Even if the drive portion for moving the reaction vessel is provided supplementarily, all of the drive force for rotating the reaction vessel does not need to be supplied from the drive portion, and thus electric power consumed to drive the drive portion can be reduced. In particular, in a case where the chemical heat storage device of the invention is mounted on a vehicle on which there is an intense need for reduction in electric power consumption, the aspect that the electric power consumption of the drive portion can be reduced is a significant effect.

In addition, at the chemical heat storage device according to the above-mentioned aspect of the invention, because the reaction vessel moves, a heat transfer property between the heat-exchange fluid flowing along the outer surface of the reaction vessel and the reaction vessel can be enhanced compared to a case where the reaction vessel does not move. In addition, because the heat storage material is agitated, a heat transfer property between the heat storage material and the reaction vessel can be enhanced compared to a case where the heat storage material is stationary. Further, the heat storage material can be reliably restricted from being aggregated and solidified, and accordingly it is restricted that the heat storage material which contributes to the heat storage or to the heat release decreases. As a result, the heat storage material can store the heat and release the heat efficiently and quickly.

At the chemical heat storage device according to the above-mentioned aspect of the invention, the heat-exchange fluid desirably corresponds to a high temperature heat-exchange fluid, and the chemical heat storage device is configured in such a manner that the reaction vessel is moved and the heat storage material is agitated, by the flow force of the high temperature heat-exchange fluid at a time of heat storage. According to the above configuration, without providing the drive portion for moving the reaction vessel, the reaction vessel is moved by the flow force of the high temperature heat-exchange fluid and the agitation of the heat storage material can be performed at the time of heat storage.

At the chemical heat storage device according to the aspect, the chemical heat storage device is desirably configured in such a manner that the reaction vessel is rotated and the heat storage material is agitated, by the flow force of the heat-exchange fluid. According to the above configuration, by rotating the reaction vessel, the heat storage material inside the reaction vessel can be agitated more uniformly compared to a case where the reaction vessel moves in a sliding manner. Thus, the heat storage material can be reliably restricted from being aggregated and solidified, and accordingly it is restricted that the heat storage material which contributes to the heat storage or to the heat release decreases. As a result, the heat storage material can store the heat and release the heat more efficiently and more quickly.

At the chemical heat storage device according to the above-mentioned aspect, the chemical heat storage device desirably further includes a cover member including an inlet port of the heat-exchange fluid and an outlet port of the heat-exchange fluid, and covering the reaction vessel, wherein the inlet port and the outlet port of the cover member are arranged at sides opposite to each other relative to a position at which the reaction vessel is arranged in the cover member. According to the above configuration, the heat-exchange fluid can be introduced via the inlet port arranged at one side of the cover member and the heat-exchange fluid can flow out from the outlet port provided a side opposite to the inlet port. Accordingly a length of the heat exchange flow path inside the cover member can be assured sufficiently. Consequently, the flow force of the heat-exchange fluid can act on the outer surface of the reaction vessel sufficiently, and the reaction vessel can be moved effectively and the heat storage material can be agitated.

At the chemical heat storage device according to the above-mentioned aspect, the outer surface of the reaction vessel desirably includes a fin facilitating heat transfer, and the chemical heat storage device is configured in such a manner that the heat-exchange fluid flows while being in contact with the fin at the heat exchange flow path. According to the above configuration, the fin provided at the outer surface of the reaction vessel to facilitate the heat transfer can be utilized also to obtain the flow force of the heat-exchange fluid. Accordingly, there is no need to provide a separate member for obtaining the flow force of the heat-exchange fluid at the reaction vessel in addition to the fin, which can simplify the configuration of the reaction vessel. In addition, the heat transfer property of the reaction vessel can be further enhanced by the fin for facilitating the heat transfer, the heat storage material can store and release the heat more efficiently and more quickly.

In the configuration in which the outer surface of the reaction vessel includes the fin, the reaction vessel is desirably divided into plural reaction vessel portions, and the fin is provided at an outer surface of each of the plural reaction vessel portions and the reaction vessel portions which are adjacent to each other are connected to each other by the fin. According to the above configuration, by dividing the reaction vessel into the plural reaction vessel portions, an area of contact (a heat transfer area) of the reaction vessel and the heat-exchange fluid with each other can be increased, and the heat transfer property at the reaction vessel can be enhanced even more. In addition, by connecting the adjacent reaction vessel portions to each other with the use of the fin, the fin also plays a role of a reinforcing member, thereby enhancing strength of the reaction vessel formed by the plural divided reaction vessel portions. Further, by providing the fin including a large length corresponding to a distance between the vessel portions, a surface area of the fin can be increased. As a result, the heat transfer property at the reaction vessel can be further enhanced.

In the configuration in which the reaction vessel is divided into the plural reaction vessel portions, the chemical heat storage device is desirably configured in such a manner that the reaction vessel is rotated and the heat storage material is agitated, by the flow force of the heat-exchange fluid, and the chemical heat storage device is configured in such a manner that a thickness of an outer shape of each of the reaction vessel portions is tapered towards an outer side in a direction of a radius of rotation and a width of the fin connecting the adjacent reaction vessel portions to each other increases as the radius of rotation increases. According to the above configuration, an area of the fin can be increased as the radius of rotation of the reaction vessel increases, and thus the flow force of the heat-exchange fluid is made to act effectively on a portion of the fin at which the area is increased. Consequently, the whole of the reaction vessel formed from the plural reaction vessel portions can be rotated efficiently.

In this case, the fin is desirably arranged at plural positions around a rotation center of the reaction vessel. According to the above configuration, the flow force of the heat-exchange fluid can be made to act continuously on each of the plural fins arranged around the rotation center, thereby rotating the reaction vessel without generating rotational fluctuations. In addition, a heat transfer property of the reaction vessel around the rotation center is provided with isotropy, and thus the heat storage to the heat storage material and the heat release from the heat storage material can be performed efficiently.

At the chemical heat storage device according to the above-mentioned aspect, the chemical heat storage device desirably further includes an evaporative condenser recovering water vapor discharged from the heat storage material due to a dehydration reaction at the time of heat storage, the evaporative condenser supplying, to the heat storage material, water vapor performing a hydration reaction with the heat storage material at a time of heat release, and the evaporative condenser being configured to move together with the reaction vessel. According to the above configuration, by moving the evaporative condenser, at the time of heat storage, the water vapor is allowed to be attached to a large area of a surface of the evaporative condenser, and accordingly the water vapor can be recovered from the large area. At the time of heat release, the water is allowed to be attached to the large area of the surface of the evaporative condenser, and accordingly the water vapor can be generated from the large area by evaporating the water at the surface of the evaporative condenser. Consequently, efficiency in recovering and supplying the water vapor can be enhanced, thereby facilitating the dehydration reaction and the hydration reaction of the heat storage material. As a result, the heat storage material is allowed to store and release the heat more efficiently and more quickly. Because the evaporative condenser moves together with the reaction vessel, there is no need to provide a separate drive portion for moving the evaporative condenser, and the number of parts and components can be reduced to simply the configuration of the device. In addition, the size of the chemical heat storage device can be further reduced.

In the configuration including the evaporative condenser, the chemical heat storage device is desirably configured in such a manner that the reaction vessel is rotated by the flow force of the heat-exchange fluid and the evaporative condenser is rotated in association with rotation of the reaction vessel. According to the above configuration, by rotating the evaporative condenser, the water vapor is attached evenly to the large area of the surface of the evaporative condenser at the time of heat storage and the water is attached evenly to the large area of the surface of the evaporative condenser at the time of heat release, in a state where a range of movement of the evaporative condenser is reduced as much as possible compared to a case where the evaporative condenser moves in a sliding manner. Consequently, at the chemical heat storage device of which the size is reduced, the efficiency in recovering and supplying the water vapor can be enhanced easily.

In the configuration in which the evaporative condenser is rotated in association with rotation of the reaction vessel, the chemical heat storage device desirably further includes a steam pipe connecting the evaporative condenser and the reaction vessel to each other, wherein the evaporative condenser is configured to be rotated about the steam pipe serving as a rotation axis together with the rotation of the reaction vessel. According to the above configuration, the reaction vessel and the evaporative condenser can be co-rotated with each other easily about the steam pipe serving as the rotation axis, and thus the chemical heat storage device can be operated in a single of mechanical movement.

In this case, the steam pipe desirably includes a turn back structure restricting a liquid droplet from the evaporative condenser from splashing at the hydration reaction. According to the above configuration, the liquid droplet can be restricted by the turn back structure from being supplied to the reaction vessel, and thus the liquid droplet can be restricted from splashing directly to the heat storage material. Thus, the heat storage material is prevented from being aggregated and solidified due to the liquid droplet. As a result, the decrease of the heat storage material which contributes to the heat storage or to the heat release can be restricted.

In the configuration that further includes the evaporative condenser, the chemical heat storage device desirably further includes a valve provided between the evaporative condenser and the reaction vessel, and controlling a flow of the water vapor between the evaporative condenser and the reaction vessel. According to the above configuration, the valve is closed to restrict the water vapor from flowing at times other than the times of heat storage and heat release. Consequently, at the times other than the times of heat storage and heat release, the dehydration reaction or the hydration reaction can be restricted from occurring at the heat storage material.

At the chemical heat storage device according to the above-mentioned aspect, the reaction vessel is desirably provided at a vehicle including an internal combustion engine, and the chemical heat storage device is configured in such a manner that the heat storage by the heat storage material is performed in a manner that the high temperature heat-exchange fluid formed by a high temperature exhaust gas flows along the outer surface of the reaction vessel after completion of warming up of the internal combustion engine of the vehicle and heating of a predetermined portion of the vehicle is performed in a manner that the heat storage material is made to release heat before the completion of the warming up of the internal combustion engine of the vehicle. According to the above configuration, in a case where the chemical heat storage device of the invention is mounted on the vehicle, the heat can be absorbed from the high temperature exhaust gas efficiently and quickly after the completion of the warming up, and the absorbed heat can be discharged efficiently and quickly to warm the predetermined portion of the vehicle before the completion of the warming up. As a result, the heat of the exhaust gas of the vehicle is utilized and the electric power consumption on the vehicle can be reduced.

In this case, the chemical heat storage device is desirably configured in such a manner that heating of a low temperature heat-exchange fluid is performed in a manner that the heat storage material which has stored the heat is made to release the heat before the completion of the warming up of the internal combustion engine of the vehicle, the low temperature heat-exchange fluid being formed by a low temperature exhaust gas before the completion of the warming up and before passing through a catalyst. According to the above configuration, the low temperature exhaust gas is raised in temperature (the low temperature exhaust gas is heated), and then passes through the catalyst in a state where the low temperature exhaust gas has been turned to the high temperature exhaust gas. Consequently, purification of the exhaust gas by the catalyst can be facilitated.

In the application, in addition to the chemical heat storage device according to the above-mentioned aspect, other configuration described below can be considered.

That is, the chemical heat storage device according to the other configuration of the application includes a reaction vessel accommodating a heat storage material, a heat exchange flow path provided so that a high temperature heat-exchange fluid and a low temperature heat-exchange fluid flow along an outer surface of the reaction vessel, and a switch portion which can switch, from among the high temperature heat-exchange fluid and the low temperature heat-exchange fluid, a heat-exchange fluid that flows through the heat exchange flow path, and the chemical heat storage device is configured in such a manner that the reaction vessel is moved and the heat storage material is agitated, by a flow force of at least one of the high temperature heat-exchange fluid and the low temperature heat-exchange fluid. According to the above-mentioned configuration, the reaction vessel is moved by the flow force of the at least one of the high temperature heat-exchange fluid and the low temperature heat-exchange fluid, and the heat storage material is agitated. Without providing a drive portion for moving the reaction vessel, the reaction vessel is moved by the flow force of the at least one of the high temperature heat-exchange fluid and the low temperature heat-exchange fluid, and the heat storage material is agitated. As there is no need to provide the drive portion, the number of parts and components can be reduced and a configuration of the device can be simplified accordingly, and a size of the whole chemical heat storage device can be reduced. In addition, even if the drive portion for moving the reaction vessel is provided supplementarily, all of the drive force for moving the reaction vessel does not need to be supplied from the drive portion, and thus electric power consumed to drive the drive portion can be reduced. In particular, in a case where the chemical heat storage device of the invention is mounted on a vehicle on which there is an intense need for reduction in electric power consumption, the aspect that the electric power consumption of the drive portion is reduced is a significant effect.

In addition, at the chemical heat storage device according to the other configuration of the application, because the reaction vessel moves, a heat transfer property between the high temperature heat-exchange fluid and the high temperature heat-exchange fluid which flow along the outer surface of the reaction vessel, and the reaction vessel can be enhanced compared to a case where the reaction vessel does not move. In addition, because the heat storage material is agitated, a heat transfer property between the heat storage material and the reaction vessel can be enhanced compared to a case where the heat storage material is stationary. Further, the heat storage material can be reliably prevented from being aggregated and solidified, and accordingly it is restricted that the heat storage material which contributes to the heat storage or the heat release decreases. As a result, the heat storage material can be made to store and release the heat efficiently and quickly. Further, by providing the switch portion that can switch, between the high temperature heat-exchange fluid and the low temperature heat-exchange fluid, the heat exchange fluid which flows through the heat exchange flow path, a state in which the heat storage material stores the heat from the high temperature heat-exchange fluid and a state in which the heat storage material releases the heat to the low temperature heat-exchange fluid can be easily switched to each other.

Effects of the Invention

According to the invention, as described above, without providing the drive portion for moving the reaction vessel, the heat storage material can be agitated by moving the reaction vessel.

MODE FOR CARRYING OUT THE INVENTION

An embodiment of the invention will be described with reference to the drawings.

A configuration of a chemical heat storage device 100 according to the embodiment of the invention will be described with reference to FIGS. 1 to 7.

Figure 1:
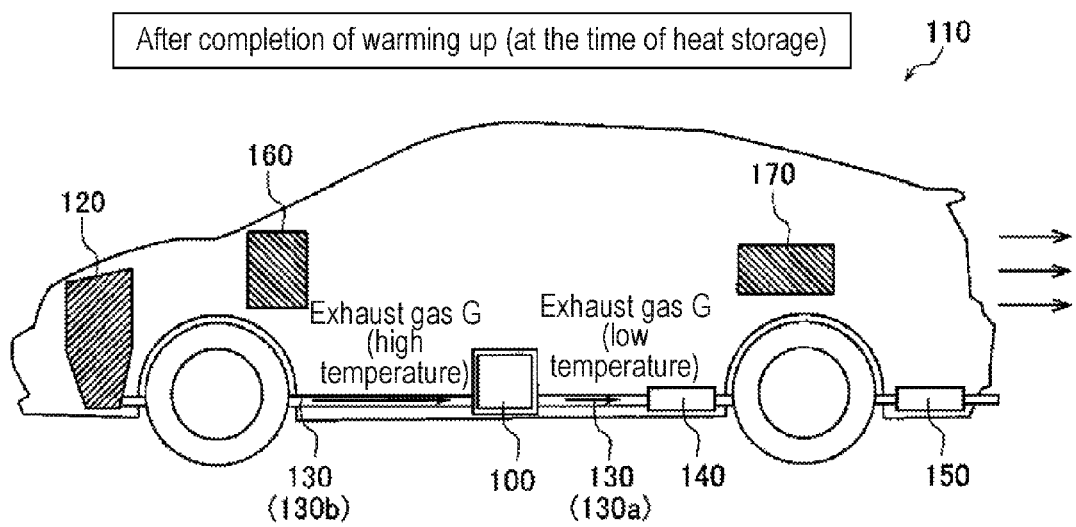
FIG. 1 A schematic view illustrating a state of a vehicle at the time of heat storage of a chemical heat storage device according to an embodiment of the invention FIG. 2 A schematic view illustrating a state of the vehicle at the time of heat release of the chemical heat storage device according to the embodiment of the invention FIG. 3 An exploded perspective view illustrating the chemical heat storage device according to the embodiment of the invention FIG. 4 A front view illustrating the chemical heat storage device according to the embodiment of the invention FIG. 5 A cross-sectional view of a vicinity of a reaction vessel which is taken along line 500-500 of FIG. 4

The chemical heat storage device 100 according to the embodiment of the invention is configured to be mounted on a vehicle 110, such as an automobile, including an engine 120 as illustrated in FIG. 1. The chemical heat storage device 100 is configured to store heat with the use of a high temperature exhaust gas G which is discharged from the engine 120 and flows inside an exhaust pipe 130 after completion of warming up, for example, at a normal running of the vehicle 110. In addition, the chemical heat storage device 100 is configured to supply (release) the stored heat to a low temperature exhaust gas G which is discharged from the engine 120 and flows inside the exhaust pipe 130 before the completion of the warming up, for example, at a cold start and/or an initial stage of running of the vehicle 110. Accordingly, it is configured that the exhaust gas G that has been warmed is supplied to a heat exchanger 140 and a catalyst 150 which are arranged at a rear side relative to the chemical heat storage device 100. The engine 120 is an example of "an internal combustion engine" of the invention, the exhaust gas G is an example of "a heat-exchange fluid" of the invention. In addition, the high temperature exhaust gas G is an example of "a high temperature heat-exchange fluid" of the invention.

The heat exchanger 140 includes a function of absorbing heat from the warmed exhaust gas G and supplying the heat to a heater core 160 and a battery 170. As a result, the heater core 160 and the battery 170 are configured to be heated. In addition, the catalyst 150 includes a function of cleaning the exhaust gas G. The catalyst 150 includes a function of purifying the exhaust gas G. At the catalyst 150, the warmed exhaust gas G is cleaned more than the low temperature exhaust gas G. The heater core 160 and the battery 170 are an example of "a predetermined portion (of the vehicle)" of the invention.

Figure 3:
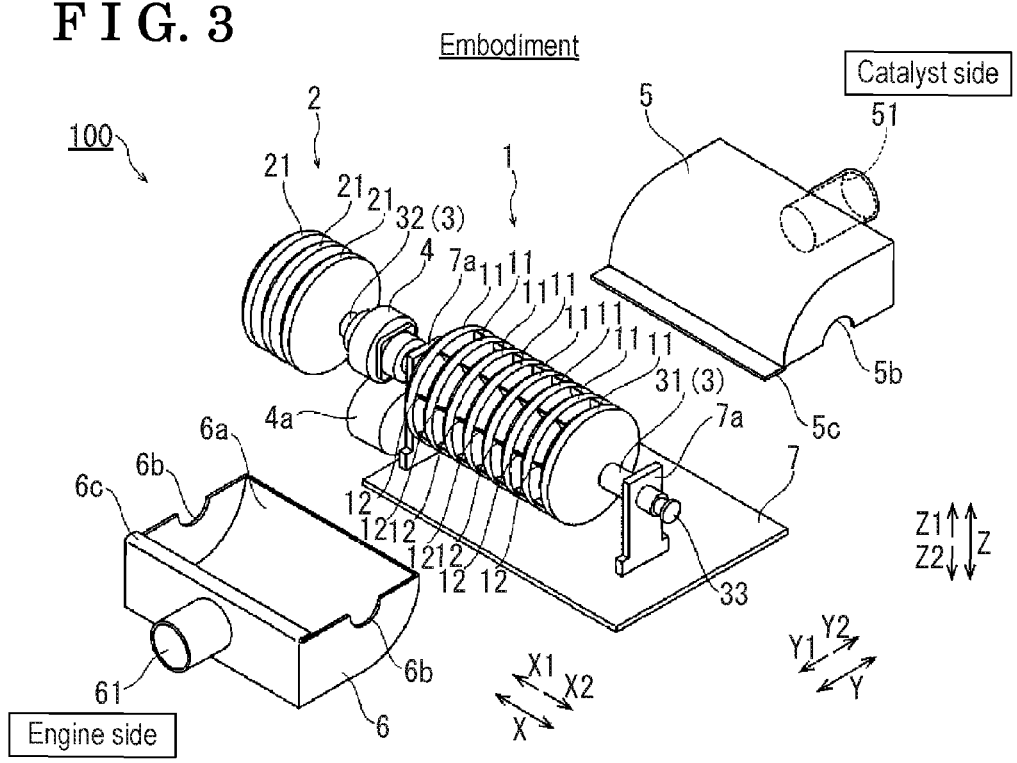
Figure 4:
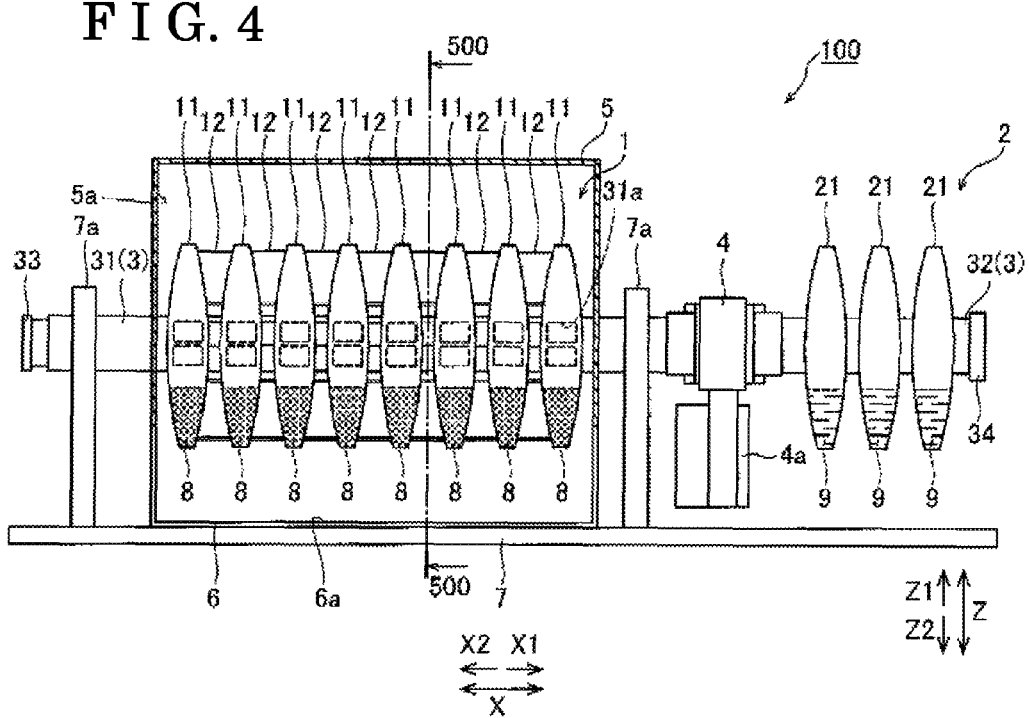

As illustrated in FIGS. 3 and 4, the chemical heat storage device 100 is provided with a reaction vessel 1, an evaporative condenser 2, a steam pipe 3 connecting the reaction vessel 1 and the evaporative condenser 2 to each other, a valve 4 provided at the steam pipe 3, an upper cover 5 covering the reaction vessel 1 from an upper side (a Z1 side) and a lower cover 6 covering the reaction vessel 1 from a lower side (a Z2 side). The steam pipe 3 is rotatably supported (journaled) by a pair of wall portions 7a provided at a base 7 to extend upwardly. The reaction vessel 1 and the evaporative condenser 2 are configured to be rotatable together with each other about the steam pipe 3 serving as a rotation axis.

The reaction vessel 1 includes a function that a heat storage material 8, which will be described later, stores heat and discharges water vapor due to a dehydration reaction at the time of heat storage and the heat storage material 8 absorbs water vapor and releases heat due to a hydration reaction at the time of heat release. The reaction vessel 1 is formed by metal including an appropriate thermal conductivity (for example, copper alloy, aluminum alloy, carbon steel, alloy steel) and is thinned to further enhance the thermal conductivity. The evaporative condenser 2 has a function of recovering the water vapor discharged from the heat storage material 8 due to the dehydration reaction at the time of heat storage and supplying the water vapor, which reacts with the heat storage material 8, to the heat storage material 8 at the time of heat release. Specific configurations of the reaction vessel 1 and the evaporative condenser 2 will be described later.

Figure 5:
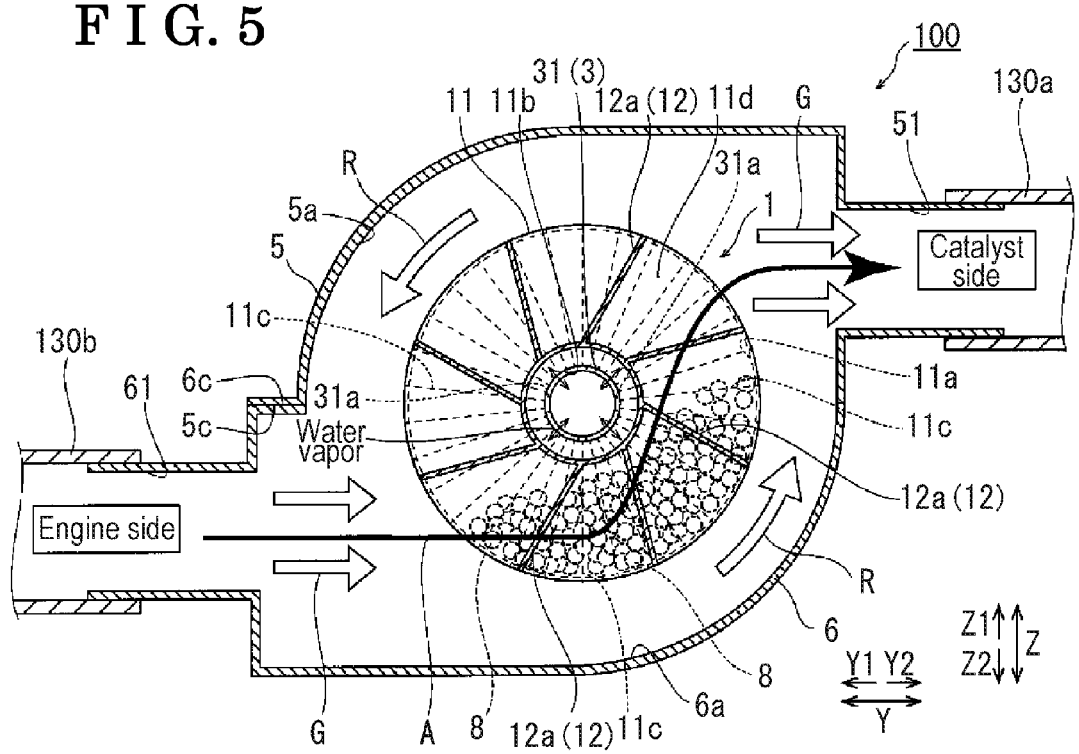

As illustrated in FIG. 5, the upper cover 5 includes an outlet port 51 connected to an exhaust pipe 130a at a side of the catalyst 150 (a Y2 side). The lower cover 6 includes an inlet port 61 connected to an exhaust pipe 130b at a side of the engine 120 (a Y1 side). Thus, the chemical heat storage device 100 is formed with a heat exchange flow path A leading from the inlet port 61 to the outlet port 51 through a space portion formed by an inner surface 5a of the upper cover 5 and an inner surface 6a of the lower cover 6. That is, it is configured in such a manner that the exhaust gas G coming in from the exhaust pipe 130b at the side of the engine 120 flows through the heat exchange flow path A and goes out to the exhaust pipe 130a at the side of the catalyst 150. Here, the inlet port 61 of the lower cover 6 and the outlet port 51 of the upper cover 5 are arranged at sides that are opposite to each other relative to a position at which a reaction vessel portion 11 is arranged. Specifically, the inlet port 61 is arranged at the Z2 side relative to a rotation center of the reaction vessel portion 11 and the outlet port 51 is arranged at the Z1 side relative to the rotation center of the reaction vessel portion 11. The upper cover 5 and the lower cover 6 are an example of "a cover member" of the invention.

As illustrated in FIG. 3, the upper cover 5 is provided with a pair of shaft contact portions 5b and the respective shaft contact portions 5b are provided at an X1 side and at an X2 side. The lower cover 6 is provided with a pair of shaft contact portions 6b and the respective shaft contact portions 6b are provided at the X1 side and at the X2 side. The upper cover 5 and the lower cover 6 are fixed to each other by, for example, welding in a state where contact surfaces 5c and 6c at the Y1 side are in contact with each other.

As illustrated in FIGS. 3 and 4, the steam pipe 3 is formed to extend in a direction X. The steam pipe 3 includes a pipe portion 31 arranged at a side of the reaction vessel 1 (the X2 side) and a pipe portion 32 arranged at a side of the evaporative condenser 2 (the X1 side). An end portion of the pipe portion 31 at the X1 side and an end portion of the pipe portion 32 at the X2 side are connected to each other via the valve 4. An end portion of the pipe portion 31 at the X2 side and an end portion of the pipe portion 32 at the X1 side are sealed with lid portions 33 and 34 (refer to FIG. 7), respectively.

The pipe portion 31 includes plural connection holes 31a formed at positions corresponding to the reaction vessel portion 11. The connection holes 31a connect a heat storage material accommodation portion 11a, which will be described below, of the reaction vessel portion 11 and an inside of the steam pipe 3 to each other. It is configured in such a manner that the water vapor flows through between the heat storage material accommodation portion 11a of the reaction vessel portion 11 and the inside of the steam pipe 3 via the connection hole 31a.

The valve 4 is configured to control the flow of the water vapor between the evaporative condenser 2 and the reaction vessel 1 by controlling the flow of the water vapor between the inside of the pipe portion 31 and the inside of the pipe portion 32. Consequently, in a case where the valve 4 is open, the water vapor flows through between the evaporative condenser 2 and the reaction vessel 1 and thus the heat storage or the heat release is performed. On the other hand, in a case where the valve 4 is closed, the water vapor does not flow through between the evaporative condenser 2 and the reaction vessel 1 and thus the heat storage or the heat release is not performed. In addition, a valve drive portion 4a for opening and closing the valve 4 is provided at a lower side (the Z2 side) relative to the valve 4.

Figure 6:
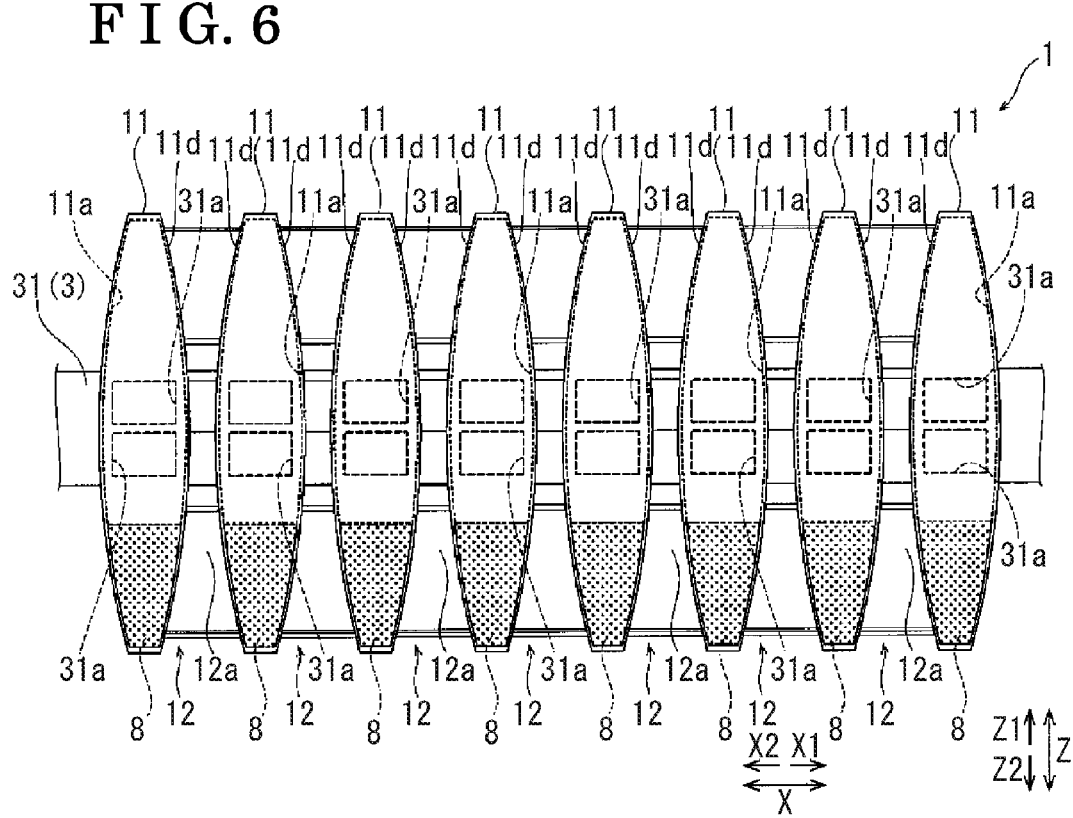
FIG. 6 An enlarged front view illustrating the reaction vessel of the chemical heat storage device according to the embodiment of the invention FIG. 7 An enlarged front view illustrating an evaporative condenser of the chemical heat storage device according to the embodiment of the invention FIG. 8 A side view illustrating a vicinity of a reaction vessel portion according to a first modification of the embodiment of the invention FIG. 9 A front view illustrating a reaction vessel portion according to a second modification of the embodiment of the invention FIG. 10 A side view illustrating a reaction vessel portion according to a third modification of the embodiment of the invention FIG. 11 A front view illustrating the reaction vessel portion according to the third modification of the embodiment of the invention

As illustrated in FIG. 6, the reaction vessel 1 is divided into eight reaction vessel portions 11 each formed in a disc shape. The eight reaction vessel portions 11 are arranged to be aligned to one another in the direction X in which the pipe portion 31 extends. The reaction vessel portion 11 includes a shape of which a width in the direction X increases towards a center in a height direction (a direction Z), and an inside of the reaction vessel portion 11 is made to be hollow. In other words, a thickness in the direction X of an outer shape of each reaction vessel portion 11 is tapered towards an outer side in a direction of a radius of rotation. In addition, as illustrated in FIG. 5, a piping hole 11b through which the pipe portion 31 is inserted is formed at a substantially center of the reaction vessel portion 11 so as to penetrate the reaction vessel portion 11 in the direction X. Thus, the reaction vessel portion 11 is formed in a ring shape when viewed from a side surface (the X1 side).

The hollow inside of the reaction vessel portion 11 accommodates plural heat storage materials 8 and functions as the heat storage material accommodation portion 11a. The plural heat storage materials 8 are accommodated to occupy substantially 40 percent of an internal volume of the heat storage material accommodation portion 11a.

The heat storage material 8 is formed by calcium oxide (CaO). The heat storage material 8 which is formed by calcium oxide (the heat storage material 8 which can release heat) is configured to undergo the hydration reaction with the water vapor supplied from the evaporative condenser 2 at the time of heat release, and thereby changing to calcium hydroxide $Ca(OH)_2$ and discharging the heat (releasing the heat). In addition, the heat storage material 8 which is formed by calcium hydroxide (the heat storage material 8 which can store heat) is configured to discharge the water vapor and absorb heat (stores heat) due to the dehydration reaction at the time of heat storage, thereby changing to calcium oxide. Accordingly, the heat storage material 8 is configured to perform the chemical heat storage by using the chemical reactions. In addition, the heat storage material 8 is configured to store the heat or release the heat by being in contact with an interior surface of the heat storage material accommodation portions 11a of the reaction vessel portion 11. A grain diameter of the heat storage material 8 is substantially several hundred μm. In FIG. 5, each heat storage material 8 is shown larger in size than an actual size.

A vane portion 11c is formed at the interior surface of the heat storage material accommodation portion 11a to increase an area of contact with the heat storage material 8. The plural vane portions 11c are formed to extend radially from a center of the reaction vessel portions 11.

Here, in the embodiment, as illustrated in FIG. 6, a fin 12 is provided at an outer surface 11d of each of the eight reaction vessel portions 11. The fin 12 is formed integrally with the reaction vessel portion 11, and the fin 12 includes eight (eight pieces of) fin portions 12a extending from a vicinity of a central portion to an outward side. As illustrated in FIG. 5, the fin 12 is arranged at the heat exchange flow path A and includes a function of facilitating heat transfer of the exhaust gas G and the outer surface 11d of the reaction vessel portion 11 to each other. Further, at the heat exchange flow path A, the exhaust gas G (the high temperature exhaust gas G at the time of heat storage and the low temperature exhaust gas G at the time of heat release) flowing along the outer surface 11d of the reaction vessel portion 11 flows while being in contact with the fin 12, and consequently the fin 12 is configured in such a manner that a rotational drive power on the basis of a flow force of the exhaust gas G is generated at the fin 12. Thus, the reaction vessel 1 (the reaction vessel portions 11) is configured to rotate in a rotation direction R. That is, at the time of heat storage and at the time of heat release, the reaction vessel portions 11 are rotated by the flow force of the exhaust gas G and thus the heat storage materials 8 accommodated in the heat storage material accommodation portion 11a are agitated or stirred. Further, as illustrated in FIGS. 3 and 4, the reaction vessel 1 and the evaporative condenser 2 are connected to each other via the steam pipe 3, and thus the steam pipe 3 and the evaporative condenser 2 are configured to rotate in association with the rotation of the reaction vessel 1.

In addition, as illustrated in FIG. 6, the fin 12 is formed between each of the eight reaction vessel portions 11, and the fin 12 extends in the direction X so as to connect the adjacent reaction vessel portions 11 to each other. A width of each fin 12 (a width of the fin portion 12a in the direction X), which connects the adjacent reaction vessel portions 11 to each other, is configured to increase as the radius of rotation increases. Accordingly, an area of the fin portion 12a increases as the radius of rotation of the reaction vessel portion 11 increases. From among the eight reaction vessel portions 11, the outer surface 11d at the X1 side of the reaction vessel portion 11 positioned at an end portion at the X1 side is not provided with the fin 12 and the outer surface 11d at the X2 side of the reaction vessel portion 11 positioned at an end portion at the X2 side is not provided with the fin 12.

As illustrated in FIG. 5, the eight fin portions 12a of the fin 12 are provided in a state where the fin portions 12a are inclined relative to straight lines extending radially from the center. Specifically, each fin portion 12a is inclined relative to the straight line extending radially from the center so that a center-side end portion of the fin portion 12a is positioned at a front side in the rotation direction R relative to an outward-side end portion of the fin portion 12a. Consequently, the flow force of the exhaust gas G coming in from the inlet port 61 arranged at the lower side (the Z2 side) is easily transmitted to the fin portion 12a, and thus the flow force of the exhaust gas G can be converted to the rotational drive power more efficiently.

A center of the reaction vessel 1 (the steam pipe 3) is positioned at an upper side (the Z1 side) relative to the inlet port 61 connected to the exhaust pipe 130b at the side of the engine 120 (the Y1 side). Further, the center of the reaction vessel 1 is positioned at a lower side (the Z2 side) relative to the outlet port 51 connected to the exhaust pipe 130a at the side of the catalyst 150 (the Y2 side). Thus, it is configured in such a manner that the exhaust gas G introduced from the inlet port 61 is blown to a lower portion of the fin 12 and the exhaust gas G which has supplied the rotational drive power up to an upper portion of the fin 12 is discharged from the output port 51. As a result, the reaction vessel 1 is configured to be easily rotatable in the rotation direction R.

Figure 7:
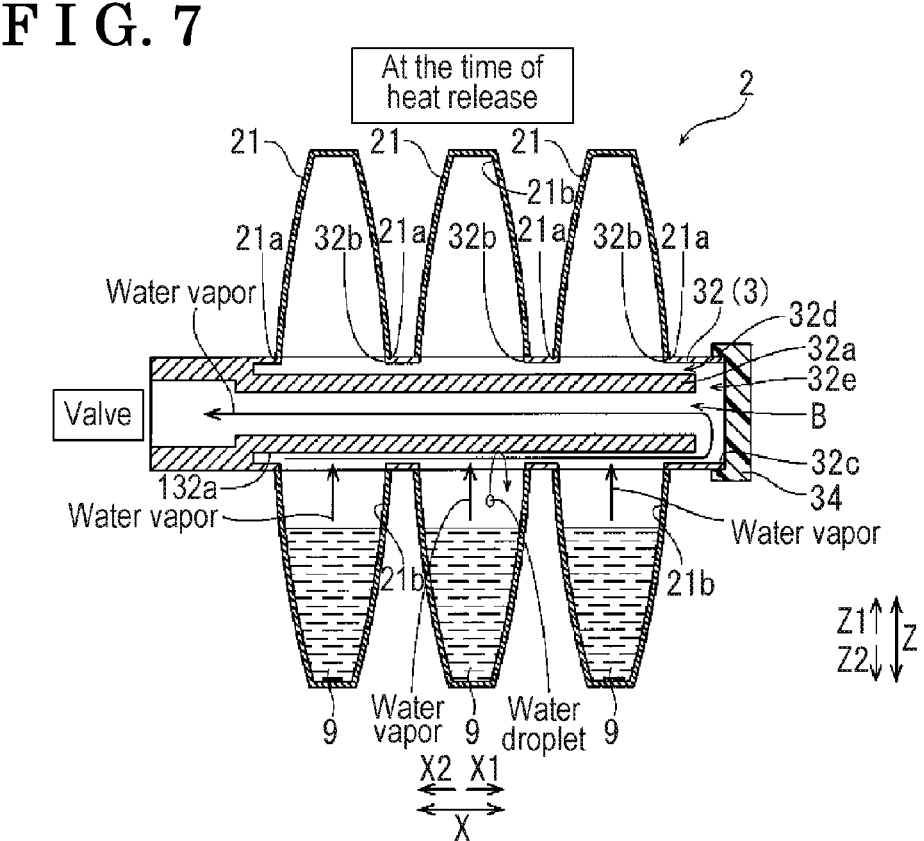

As illustrated in FIG. 7, the evaporative condenser 2 is divided into three evaporative condensing portions 21 each formed in a disc shape. The three evaporative condensing portions 21 are arranged to be aligned with one another along the direction X in which the pipe portion 32 extends. Similarly to the reaction vessel portion 11, the evaporative condensing portion 21 includes a shape of which a width in the direction X increases towards a center in the height direction (the direction Z), and an inside of the evaporative condensing portion 21 is made to be hollow. In addition, a piping hole 21a through which the pipe portion 32 is inserted is formed at the center of the evaporative condensing portion 21 so as to penetrate the evaporative condensing portion 21 in the direction X. Thus, the evaporative condensing portion 21 is formed in a ring shape when viewed from a side surface (the X1 side). The hollow inside of the evaporative condensing portion 21 accommodates water 9, that is, the condensed water vapor, and the evaporative condensing portion 21 functions as a water accommodation portion 21b. The water accommodation portion 21b includes a function of recovering the water vapor as the water 9 and supplying the water vapor.

At the pipe portion 32, at positions corresponding to the three evaporative condensing portions 21, an inside pipe 32a and connection holes 32b are provided. The inside pipe 32a extends in the X direction from a side of the valve 4 (the X2 side) towards the X1 side. The connection holes 32b are formed at the pipe portion 32 to be positioned at an outer side relative to the inside pipe 32a and connect an inside of the pipe portion 32 and the water accommodation portions 21b of the evaporative condensing portions 21 to each other.

The inside pipe 32a is arranged at a position opposing the piping holes 21a of the three evaporative condensing portions 21 in the direction Z. Because the inside pipe 32a is provided inside the pipe portion 32, a flow path 32d extending in the direction X is formed between an outer circumferential surface 132a of the inside pipe 32a and an inner circumferential surface 32c of the pipe portion 32. An end portion at the X1 side of the inside pipe 32a is formed to be positioned closer to the X2 side than an end portion at the X1 side of the pipe portion 32. As a result, a clearance 32e is provided between the lid portion 34 arranged at the end portion at the X1 side of the pipe portion 32 and the end portion at the X1 side of the inside pipe 32a.

Thus, it is configured in such a manner that the water vapor evaporated from water accommodation portions 21b reaches the flow path 32d via the connection holes 32b, and thereafter flows through inside the flow path 32d in the direction X1. After the water vapor passes through the clearance 32e and turns back, the water vapor flows through the inside pipe 32a in the direction X2 to reach the valve 4. That is, the pipe portion 32 is provided with a turn back structure B. On the other hand, it is configured in such a manner that water droplets splashed from the water accommodation portions 21b collide with the outer circumferential surface 132a of the inside pipe 32a, and thereafter are returned to the water accommodation portions 21b again.

The heat storage material accommodation portions 11a of the reaction vessel portions 11 of the reaction vessel 1 and the water accommodation portions 21b of the evaporative condensing portions 21 of the evaporative condenser 2 are connected to each other via the steam pipe 3, and a space portion formed by the heat storage material accommodation portions 11a, the water accommodation portions 21b and the steam pipe 3 is closed and sealed so that external air (for example, an exhaust gas) does not flow therein. In addition, pressure of the space portion formed by the heat storage material accommodation portions 11a, the water accommodation portions 21b and the steam pipe 3 is reduced, and thus it is configured in such a manner that the water 9 of the water accommodation portions 21b is easily evaporated in a case where the valve 4 opens.

Next, an operation of the chemical heat storage device 100 at the time of heat storage according to the embodiment of the invention will be described with reference to FIGS. 1, 4 and 5.

After the completion of the warming up, for example, at the normal running of the vehicle 110 as illustrated in FIG. 1, the high temperature exhaust gas G discharged from the engine 120 flows through the exhaust pipe 130b. Then, as illustrated in FIG. 5, the high temperature exhaust gas G coming in from the inlet port 61 flows at the outer surface 11d of the reaction vessel portion 11 at the heat exchange flow path A. At this time, the heat from the high temperature exhaust gas G is transferred to the reaction vessel portion 11 via the outer surface 11d of the reaction vessel portion 11 and the fin 12, and in consequence, the heat is transferred from the heat storage material accommodation portion 11a of the reaction vessel portion 11 to the heat storage materials 8 formed by calcium hydroxide (the heat storage materials 8 which can store heat). However, in a state where the valve 4 (refer to FIG. 4) is closed, a space portion formed by the pipe portion 31 and the eight heat storage material accommodation portions 11a is saturated with the water vapor generated by the dehydration reaction, and therefore further dehydration reaction (the heat storage) is not performed at the heat storage materials 8.

Here, the valve 4 is opened in a case where the heat storage is performed. This enables the water vapor to move towards the evaporative condenser 2 (refer to FIG. 4), and thus the heat storage materials 8 formed by calcium hydroxide come to be able to release the water vapor. Consequently, the dehydration reaction starts. The water vapor moves towards the evaporative condenser 2 and the heat is absorbed by (stored at) the heat storage materials 8. Accordingly, the heat storage is performed at the chemical heat storage device 100. The heat storage materials 8 formed by calcium hydroxide are change to calcium oxide by the dehydration reaction.

Here, in the embodiment, as the high temperature exhaust gas G enters from the inlet port 61 and flows through the heat exchange flow path A, the reaction vessel 1 (the reaction vessel portions 11) at which the fins 12 are formed is rotated in the rotation direction R about the steam pipe 3 while the steam pipe 3 serving as the rotation axis. Thus, the heat storage materials 8 are agitated and the dehydration reaction (the heat storage) is performed more efficiently. In addition, as illustrated in FIG. 4, because the evaporative condenser 2 is rotated in association with the rotation of the reaction vessel 1, the water vapor is attached to a large area of surfaces of the water accommodation portions 21b of the evaporative condensing portions 21, and is cooled to change to water. Thus, the water vapor is consumed at the evaporative condenser 2 more efficiently compared to a case where the evaporative condenser 2 does not rotate, and accordingly the dehydration reaction at the heat storage material accommodation portions 11a progresses more.

On the other hand, the valve 4 is closed when finishing the heat storage. Accordingly, the dehydration reaction progresses until the space portion formed by the pipe portion 31 and the eight heat storage material accommodation portions 11a comes to be saturated with the water vapor, however, the further dehydration reaction (the heat storage) is not performed.

Next, an operation of the chemical heat storage device 100 at the time of heat release according to the embodiment of the invention will be described with reference to FIGS. 2, 4, 5 and 7.

Figure 2:
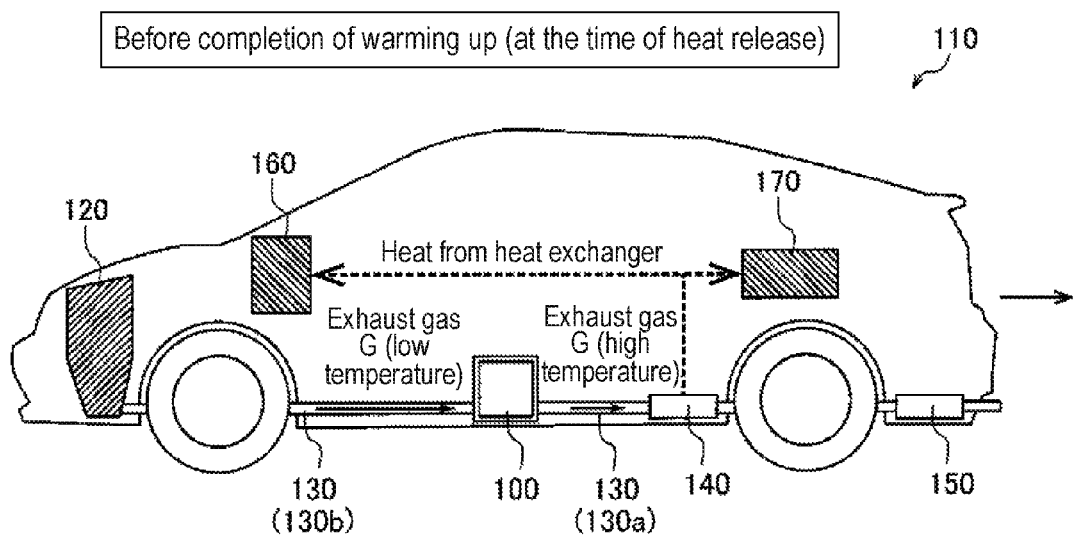

Before the completion of the warming up, for example, at the cold start and/or the initial stage of running of the vehicle 110 as illustrated in FIG. 2, the low temperature exhaust gas G discharged from the engine 120 flows through the exhaust pipe 130b. Then, as illustrated in FIG. 5, the low temperature exhaust gas G entering from the inlet port 61 flows at the outer surface 11d of the reaction vessel portion 11 at the heat exchange flow path A. At this time, the outer surface 11d of the reaction vessel portion 11 is cooled by the low temperature exhaust gas G, and the heat storage material accommodation portion 11a of the reaction vessel portion 11 is cooled by the low temperature exhaust gas G via the fin 12 (the heat is removed from the heat storage material accommodation portion 11a). However, because the water vapor does not exist in a state where the valve 4 (refer to FIG. 4) is closed, the hydration reaction (the heat release) is not performed at the heat storage materials 8. As no water vapor is present, pressure of the space portion formed by the pipe portion 31 and the eight heat storage material accommodation portions 11a is reduced, accordingly.

Here, the valve 4 is opened in a case where the heat release is performed. This reduces the pressure of the evaporative condenser 2 (refer to FIG. 4), and thus the water turns into the water vapor and the water vapor moves towards the heat storage material accommodation portions 11a via the steam pipe 3. The water vapor and the heat storage materials 8 formed by calcium oxide undergo the hydration reaction, and thus the heat is discharged (released) from the heat storage materials 8. The heat discharged from the heat storage materials 8 is supplied from the heat storage material accommodation portion 11a of the reaction vessel portion 11 to the low temperature exhaust gas G flowing through the heat exchange flow path A via the fin 12. Accordingly, the heat release is performed at the chemical heat storage device 100 and the low temperature exhaust gas G is warmed. As illustrated in FIG. 2, the heater core 160 and the battery 170 are heated via the heat exchanger 140. The heat storage materials 8 formed by calcium oxide is changed to calcium hydroxide by the hydration reaction.

As illustrated in FIG. 5, in a similar manner to the time of heat storage, the reaction vessel 1 (the reaction vessel portion 11) is rotated in the rotation direction R as the low temperature exhaust gas G comes in from the inlet port 61 and flows through the heat exchange flow path A. Thus, the heat storage materials 8 are agitated and the hydration reaction (the heat release) is performed more efficiently. In addition, as illustrated in FIG. 7, because the evaporative condenser 2 is rotated in association with the rotation of the reaction vessel 1, the water 9 accommodated in the water accommodation portions 21b of the evaporative condensing portions 21 is attached to a large area of surfaces of the water accommodation portions 21b, and is evaporated to turn into the steam. Thus, the water changes to the water vapor at the evaporative condenser 2 more efficiently compared to a case where the evaporative condenser 2 does not rotate, and accordingly the hydration reaction at the heat storage material accommodation portions 11a progresses more. In addition, pressure inside the evaporative condenser 2 changes rapidly when the valve 4 is opened, and accordingly the water 9 accommodated in the water accommodation portions 21b splashes in a form of water droplets. However, the water droplets splashed from the water accommodation portions 21b are returned to the water accommodation portions 21b again after being colliding with the outer circumferential surface 132a of the inside pipe 32a. Consequently, the water droplets are prevented from flowing to the heat storage material accommodation portions 11a of the reaction vessel portion 11 via the steam pipe 3.

On the other hand, the valve 4 is closed when finishing the heat release. Thus, the water vapor is not supplied to the heat storage material accommodation portions 11a, and accordingly the further hydration reaction (the heat release) is not performed.

In the aforementioned embodiment, the following effects can be obtained.

In the embodiment, both at the time of heat storage and at the time of heat release, the reaction vessel portions 11 of the reaction vessel 1 are rotated by the flow force of the exhaust gas G, and thus the heat storage materials 8 accommodated in the heat storage material accommodation portions 11a are configured to be agitated or stirred as described above. Consequently, without providing a drive portion for moving the reaction vessel 1, the reaction vessel 1 can be moved by the flow force of the exhaust gas G, thereby agitating the heat storage materials 8 at the times of heat storage and heat release. As there is no need to provide the drive portion, the number of parts and components can be reduced and the device configuration can be simplified, and a size of the chemical heat storage device 100 can be reduced, accordingly. Further, as there is no need to provide a drive portion for agitating the heat storage materials 8, electric power consumed at the vehicle 110 can be reduced at which there is a great need for a reduction in the electric power consumption.

In the embodiment, the reaction vessel portions 11 of the reaction vessel 1 are configured to be rotated by the flow force of the exhaust gas G. Consequently, a heat transfer property between the exhaust gas G flowing along the outer surfaces 11d of the reaction vessel portions 11 of the reaction vessel 1 and the reaction vessel 1 can be enhanced compared to a case where the reaction vessel 1 does not move (does not rotate). In addition, the heat storage materials 8 within the reaction vessel 1 can be agitated more uniformly compared to a case where the reaction vessel 1 moves in a sliding manner. Thus, the heat storage materials 8 are reliably prevented from being aggregated and solidified. As a result, it is restricted that the heat storage materials 8 which contribute to the heat storage or the heat release decrease. Further, as the heat storage materials 8 are agitated, a heat transfer property between the heat storage materials 8 and the heat reaction vessel 1 can be enhanced compared to a case where the heat storage materials 8 are stationary. As results of these, the heat storage materials 8 can store the heat and release the heat, more efficiently and more quickly.

In the embodiment, the reaction vessel 1 is configured to rotate about the steam pipe 3 serving as the rotation axis, and therefore there is no need to assure a space portion for the reaction vessel 1 to move in the sliding manner. Consequently, the chemical heat storage device 100 can be downsized.

In the embodiment, the lower cover 6 including the inlet port 61 of the exhaust gas G and covering the reaction vessel 1, and the upper cover 5 including the outlet port 51 of the exhaust gas G and covering the reaction vessel 1 are provided. The inlet port 61 of the lower cover 6 and the outlet port 51 of the upper cover 5 are arranged at the sides that are opposite to each other (the inlet port 61 is arranged at the Z2 side and the outlet port 51 is arranged at the Z1 side) relative to the position at which the reaction vessel 1 is positioned. The exhaust gas G is allowed to flow in via the inlet port 61 arranged at the lower cover 6 at one side and is allowed to flow out from the outlet port 51 of the upper cover 5 arranged at the side that is opposite to the inlet port 61, and accordingly a sufficient length of the heat exchange flow path A of the inside can be assured. Consequently, the flow force of the exhaust gas G can be made to act on the outer surfaces 11d of the reaction vessel 1 (the eight reaction vessel portions 11) sufficiently, and the reaction vessel 1 (the eight reaction vessel portions 11) can be effectively moved in the rotating manner to agitate the heat storage materials 8.

In the embodiment, at the heat exchange flow path A, the exhaust gas G (the high temperature exhaust gas G at the time of heat storage and the low temperature exhaust gas G at the time of heat release) flowing along the outer surfaces 11d of the reaction vessel portions 11 flows while being in contact with the fins 12, and the rotational drive power according to the flow force of the exhaust gas G is configured to be generated at the fins 12. Thus, the fins 12 provided at the outer surfaces 11d of the reaction vessel portions 11 of the reaction vessel 1 to facilitate the heat transfer can be utilized also to obtain the flow force from the exhaust gas G. Accordingly, there is no need to separately provide a member for obtaining the flow force from the exhaust gas G at the reaction vessel 1 in addition to the fins 12, which can simplify the configuration of the reaction vessel 1. In addition, the heat transfer property of the reaction vessel 1 can be enhanced by the fins 12 which are for facilitating the heat transfer, thereby causing the heat storage materials 8 to store and to release the heat more efficiently and more quickly.

In the embodiment, the reaction vessel 1 is divided into the eight reaction vessel portions 11. Thus, an area of contact (a heat transfer area) of the reaction vessel 1 and the exhaust gas G with each other can be made larger, and the heat transfer property at the reaction vessel 1 is enhanced even more.

In the embodiment, the fin 12 provided between each of the eight reaction vessel portions 11 is formed so as to connect the neighboring vessel portions 11 to each other. The fin 12 serves also as a reinforcing member, thereby enhancing strength of the reaction vessel 1 formed by the divided eight reaction vessel portions 11. Further, by providing the fin 12 including a large width corresponding to a distance between the vessel portions 11, a surface area of the fin 12 can be increased. As a result, the heat transfer property at the reaction vessel 1 can be enhanced even more.

In the embodiment, the reaction vessel 1 is configured to be rotated by the flow force of the exhaust gas G and thus the heat storage materials 8 are agitated. Because the thickness of the outer shape of each reaction vessel portion 11 in the X direction is tapered towards the outer side in the direction of the radius of rotation, the width of the fin 12 (the fin portion 12a), which connects the adjacent reaction vessel portions 11 to each other, is configured to increase as the radius of rotation increases. Accordingly, an area of the fin 12 can be increased as the direction of the radius of rotation of the reaction vessel 1 increases, and thus the flow force of the exhaust gas G acts effectively on the portion of the fin 12 at which the area is increased. Consequently, the whole of the reaction vessel 1 formed from the eight reaction vessel portions 11 can be rotated efficiently.

In the embodiment, the plural fins 12 are arranged around the rotation center of the reaction vessel 1. In this case, the eight (the eight sheets) fins 12 are arranged around the rotation center of one reaction vessel portion 11. Thus, the flow force of the exhaust gas G can be made to act continuously on each of the eight fins 12 arranged around the rotation center, thereby rotating the reaction vessel 1 (the reaction vessel portions 11) in the direction R indicated with the arrows without generating rotational fluctuations. In addition, the heat transfer property around the rotation center of the reaction vessel 1 (the reaction vessel portions 11) includes isotropy, and thus the heat storage to the heat storage material 8 and the heat release from the heat storage material 8 can be performed efficiently.

In the embodiment, the reaction vessel 1 is configured to be rotated by the flow force of the exhaust gas G and the evaporative condenser 2 is configured to be rotated in association with the rotation of the reaction vessel 1. The evaporative condenser 2 is configured to be rotatable about the steam pipe 3 serving as the rotation shaft at this time. Accordingly, there is no need to provide a drive portion separately, to rotate the evaporative condenser 2, and the number of parts and components can be reduced and the configuration of the chemical heat storage device 100 can be simplified more, and the size of the chemical heat storage device 100 can be reduced more. In addition, because the reaction vessel 1 and the evaporative condenser 2 can be co-rotated with each other easily about the steam pipe 3 serving as the rotation shaft, the chemical heat storage device 100 can be operated in a single system of mechanical movement.

In addition, by rotating the evaporative condenser 2 about the steam pipe 3 serving as the rotation axis, the water vapor is made to attach evenly to the large area of the surfaces of the water accommodation portions 21b of the evaporative condensing portions 21 of the evaporative condenser 2 at the time of heat storage, and therefore the water vapor can be recovered from the large area. At the time of heat release, the water is made to attach evenly to the large area of the surfaces of the water accommodation portions 21*b* of the evaporative condensing portions 21, and therefore the water vapor can be generated from the large area by evaporating the water at the surfaces of the water accommodation portions 21*b* of the evaporative condensing portions 21. Consequently, efficiency in recovering and supplying the water vapor can be enhanced, thereby facilitating the dehydration reaction and the hydration reaction at the heat storage materials 8. As a result, the heat storage materials 8 are allowed to store and release the heat more efficiently and more quickly.

In the embodiment, by providing the turn back structure B at the pipe portion 32, the liquid droplets are restricted by the turn back structure B from being supplied to the reaction vessel 1, and thus the liquid droplets are restricted from splashing directly to the heat storage materials 8. Accordingly, the heat storage materials 8 are restricted from being aggregated and solidified due to the water droplets. As a result, the decrease of the heat storage materials 8 which contribute to the heat storage or the heat release can be restricted.

In the embodiment, the communication of the water vapor between the inside of the pipe portion 31 and the inside of the pipe portion 32 is controlled by the valve 4, and accordingly the communication of the water vapor between the evaporative condenser 2 and the reaction vessel 1 is controlled. Because the valve 4 is closed to restrict the flow of the water vapor at times other than the times of heat storage and heat release, the dehydration reaction or the hydration reaction can be restricted from occurring at the heat storage materials 8 at the times other than the times of heat storage and heat release. In addition, by closing the valve 4 at the times other than the times of heat storage and heat release, the water 9 in the water accommodation portions 21*b* of the evaporative condenser 2 is restricted from flowing into the reaction vessel 1 even in a case where any impact or shock is applied to the chemical heat device 100. Consequently, the heat storage materials 8 are reliably prevented from being aggregated and solidified due to the water flowing in.

In the embodiment, after the completion of the warming up, for example, at the normal running of the vehicle 110, the high temperature exhaust gas G discharged from the engine 120 flows through the exhaust pipe 130*b*. As the high temperature exhaust gas G coming in from the inlet port 61 flows at the outer surfaces 11*d* of the reaction vessel portions 11 at the heat exchange flow path A, the heat storage is performed at the chemical heat storage device 100. On the other hand, before the completion of the warming up, for example, at the cold start and/or the initial stage of running of the vehicle 110, the low temperature exhaust gas G discharged from the engine 120 flows through the exhaust pipe 130*b*. As the low temperature exhaust gas G coming in from the inlet port 61 flows at the outer surfaces 11*d* of the reaction vessel portions 11 at the heat exchange flow path A, the heat release is performed at the chemical heat storage device 100, and thus the low temperature exhaust gas G is warmed. As a result, the heater core 160 and the battery 170 are heated via the heat exchanger 140. Accordingly, the heat can be absorbed efficiently and quickly from the high temperature exhaust gas G after the completion of the warming up and the absorbed heat can be released efficiently and quickly before the completion of the warming up, to warm the heater core 160 and the battery 170 of the vehicle 110. In consequence, the heat of the exhaust gas G of the vehicle 110 is used efficiently and the consumption of electric power at the vehicle 110 can be reduced.

In the embodiment, by allowing the heat storage materials 8 having stored the heat to release the stored heat before the completion of the warming up of the engine 120 of the vehicle 110, the low temperature exhaust gas G before the completion of the warming up and before the passage through the catalyst 150 is heated. Accordingly, by increasing (heating) the temperature of the low temperature exhaust gas G, the low temperature exhaust gas G is changed to the high temperature exhaust gas G and is then allowed to pass through the catalyst 150 in a state where the low temperature exhaust gas G has been changed to the high temperature exhaust gas G, and thus purification of the exhaust gas G by the catalyst 150 can be facilitated.

The embodiment disclosed here should be considered as an example in all aspects and should not be considered as a limiting example. The scope of the invention is indicated by the scope of the claims but not by the description of the aforementioned embodiment. Further, the scope of the invention includes meanings that are equivalent to the scope of the claims and all the changes and includes modifications within the scope of the claims.

For example, in the aforementioned embodiment, the example is described in which the chemical heat storage device of the invention is mounted on the vehicle, however, the invention is not limited thereto. The chemical heat storage device of the invention may be mounted on a movable body other than a vehicle and may be used as an installation-type chemical heat storage device.

In the aforementioned embodiment, the exhaust gas G is used as an example of the heat-exchange fluid of the invention, however, the invention is not limited thereto. In the invention, the heat-exchange fluid may be a fluid other than the exhaust gas. For example, the heat-exchange fluid may be a coolant fluid, for example.

In the aforementioned embodiment, the example is described in which the high temperature exhaust gas G is used as the high temperature heat-exchange fluid and the low temperature exhaust gas G is used as the low temperature heat-exchange fluid (that is, the exhaust gasses G are used for the heat-exchange fluids), however, the invention is not limited thereto. For example, the high temperature exhaust gas G may be used as the high temperature heat-exchange fluid and an air for warming up which is supplied from a pipe of a system that is different from the exhaust pipe through which the exhaust gas is supplied may be used as the low temperature heat-exchange fluid. In this case, by providing a switch portion which can switch between the exhaust gas and the air for warming up, a state where the heat storage material stores the heat from the high temperature heat-exchange fluid and a state in which the heat storage material releases the heat to the low temperature heat-exchange fluid can be easily switched to each other. Further, by using the air for the warming up to heat the heater core and the battery, the need for providing the heat exchanger at the vehicle is eliminated.

In the aforementioned embodiment, the example is described in which the reaction vessel 1 (the reaction vessel portions 11) provided with the fins 12 is rotated in the rotation direction R only by the flow force of the exhaust gas G, however, the invention is not limited thereto. In the invention, an auxiliary drive portion which generates an auxiliary drive power for rotating the reaction vessel may be provided, thereby rotating the reaction vessel with the use of a drive power other than the flow force of the exhaust gas. Accordingly, the heat storage materials can be agitated more reliably. Even in a case where the auxiliary drive portion is provided, all of the drive power for rotating the reaction vessel provided with the fin does not need to be supplied from the auxiliary drive portion, and thus electric power consumption for driving the auxiliary drive portion can be reduced. Consequently, in the vehicle in which there is a great need for the reduction of the electric power consumption, the electric power consumption can be reduced.

In the aforementioned embodiment, the example is described in which the heat storage materials 8 are agitated by the rotation of the reaction vessel 1, however, the invention is not limited thereto. For example, by moving the reaction vessel in a sliding manner or by pivoting (swinging) the reaction vessel, the heat storage materials may be agitated.

In the aforementioned embodiment, the heat storage material formed by calcium oxide (CaO) is used as an example of the heat storage material 8 of the invention, however, the invention is not limited thereto. In the invention, the heat storage material which can perform the chemical heat storage may be used. For example, the heat storage material formed by material other than calcium oxide (CaO), for example, calcium sulfate ($CaSO_4$), magnesia oxide (MgO) and barium monoxide (BaO), may be used.

In the aforementioned embodiment, the example is described in which the reaction vessel 1 is divided into the eight reaction vessel portions 11, however, the invention is not limited thereto. In the invention, the reaction vessel may not be divided and may be divided into plural pieces other than eight pieces. In order to increase the area of contact (the heat transfer area) of the reaction vessel and the heat-exchange fluid with each other thereby to enhance the heat transfer property, it is ideal that the reaction vessel is divided into a large number of pieces.

Figure 8:
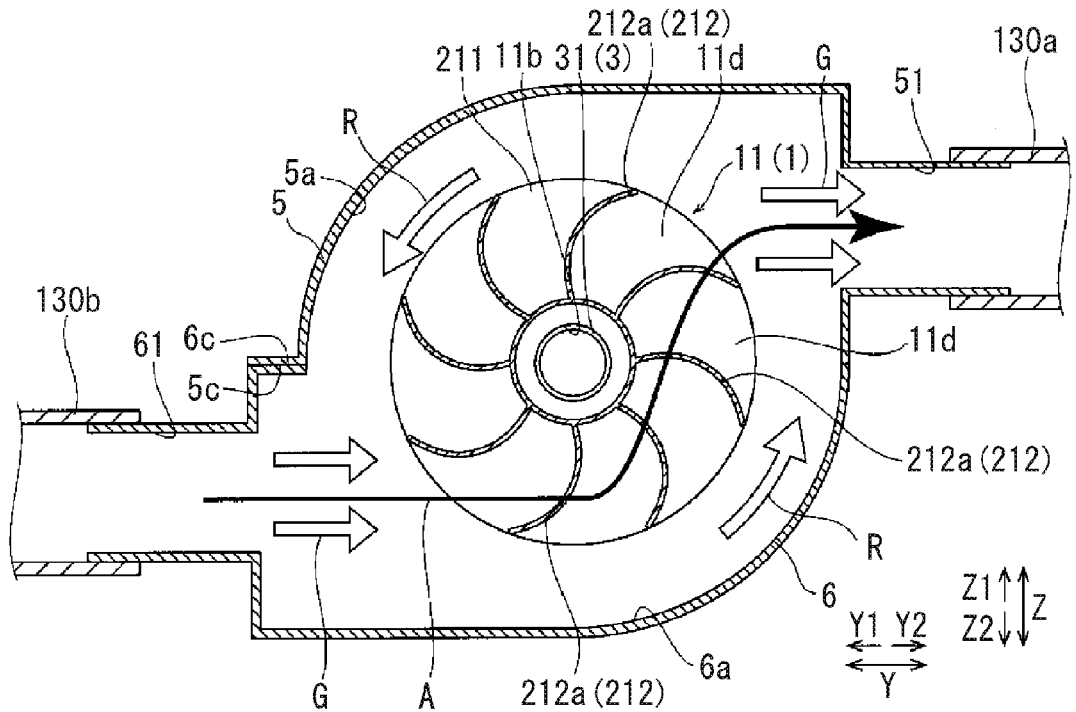

In the aforementioned embodiment, the example is described in which the eight fin portions 12a of the fin 12 are provided in a state where the fin portions 12a are inclined relative to the straight lines extending radially from the center, however, the invention is not limited thereto. For example, as in a first modification of the embodiment which is illustrated in FIG. 8, a fin portion 212a may be formed at the outer surface 11d of a reaction vessel portion 211. The fin portion 212a is formed in a curved shape so that a central portion of the fin portion 212a protrudes towards the front side in the rotation direction R relative to both end portions of the fin portion 212a when viewed from a side surface. The exhaust gas G is guided from the both end portions of the fin portion 212a towards the protruding portion at the center of the fin portion 212a, and thus the flow force of the exhaust gas G is applied much to the protruding portion at the center of the fin portion 212a. Consequently, the flow force of the exhaust gas G can be converted to the rotational drive power more efficiently.

Figure 9:
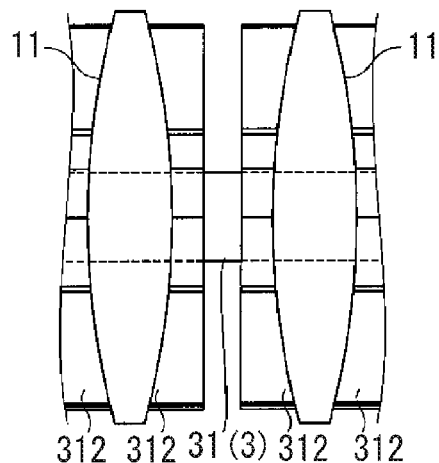

In the aforementioned embodiment, the example is described in which the fin 12 connects the adjacent reaction vessel portions 11 to each other, however, the invention is not limited thereto. For example, as in a second modification of the embodiment which is illustrated in FIG. 9, a fin 312 (a fin portion 312a) may be formed in a manner that the fin 312 (the fin portion 312a) does not connect the adjacent reaction vessel portions 11 to each other. Because the fin 312 does not connect the reaction vessel portions 11 to each other, a length of the fin 312 can be reduced accordingly. Thus, weight of the fin 312 can be reduced. As a result, weight of the chemical heat storage device itself can be reduced. In addition, because the reaction vessel portions 11 are not connected to each other by the fin 312, the reaction vessel portions 11 can be handled individually unlike the case where the reaction vessel portions 11 are connected to each other by the fin. Consequently, the chemical heat storage device can be assembled easily.

Figure 10:
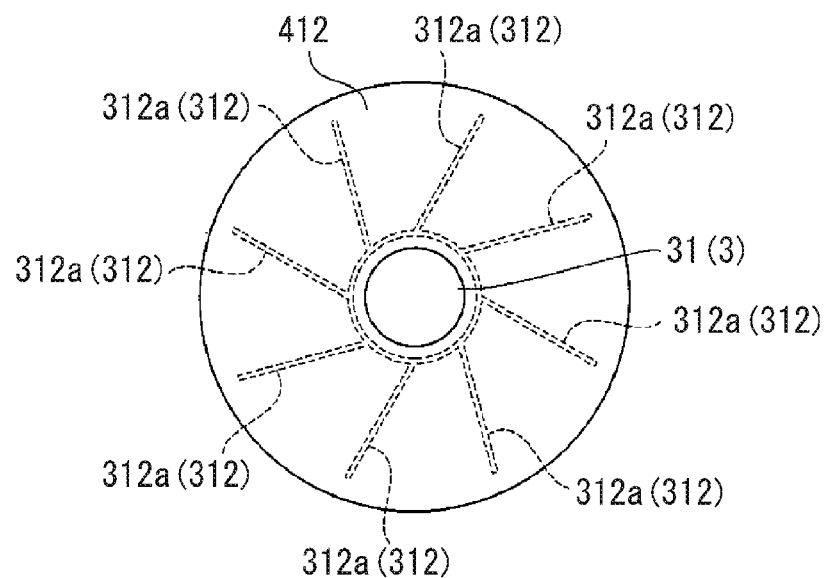
Figure 11:
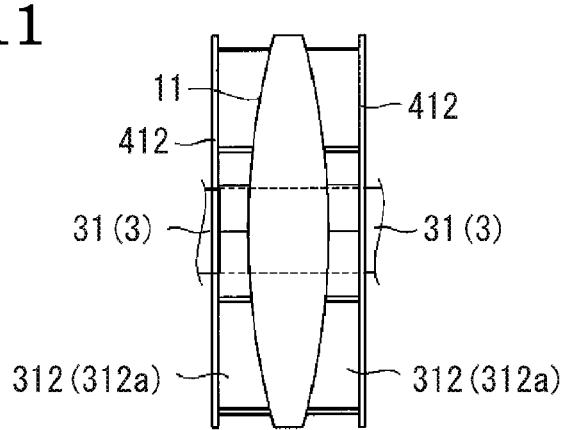

In a case where the fin 312 is not formed in such a manner that the fin 312 does not connect the adjacent reaction vessel portions 11 to each other as shown by the second modification, a wind guiding plate 412 guiding the exhaust gas (the heat-exchange fluid) to the fin 312 may be provided at an end portion at a separated side of the fin 312 (an end portion at a side opposite to the reaction vessel portion 11) as in a third modification illustrated in FIGS. 10 and 11. The wind guiding plate 412 includes a hole portion for the steam pipe 3 (the pipe portion 31) to be inserted and the hole portion is formed at a substantially center of the wind guiding plate 412. The wind guiding plate 412 is formed in a disc shape (a ring shape) when viewed from a side surface. An outer circumferential edge of the wind guiding plate 412 is formed to be positioned at an outer side relative to an outer side end portion of the fin portion 312a. Thus, the wind guiding plate 412 can restrict the heat-exchange fluid from escaping from the outer side end portion of the fin portion 312a during the rotation, thereby allowing the flow force of the heat-exchange fluid to be converted to the rotational drive power more. As a result, the heat storage material is made to store and release the heat efficiently and quickly. Further, the flow force of the heat-exchange fluid can be used for the rotation of the reaction vessel efficiently.

In the aforementioned embodiment, the example is described in which, from among the eight reaction vessel portions 11, the outer surface 11d at the X1 side of the reaction vessel portion 11 positioned at the end portion at the X1 side is not provided with the fin 12 and the outer surface 11d at the X2 side of the reaction vessel portion 11 positioned at the end portion at the X2 side is not provided with the fin 12. However, the invention is not limited thereto. In the invention, the outer surface 11d at the X1 side of the reaction vessel portion 11 positioned at the end portion at the X1 side may be provided with the fin 12 and the outer surface 11d at the X2 side of the reaction vessel portion 11 positioned at the end portion at the X2 side may be provided with the fin 12.

EXPLANATION OF REFERENCE NUMERALS

1 reaction vessel
2 evaporative condenser
3 steam pipe
4 valve
5 upper cover (cover member)
6 lower cover (cover member)
8 heat storage material
11 reaction vessel portion
11d outer surface
12, 212, 312 fin
51 outlet port
61 inlet port
100 chemical heat storage device
110 vehicle
120 engine (internal combustion engine)
150 catalyst
160 heater core (predetermined portion (of the vehicle))
170 battery (predetermined portion (of the vehicle))
A heat exchange flow path
B turn back structure
G exhaust gas (heat-exchange fluid, high temperature heat-exchange fluid, low temperature heat-exchange fluid)

The invention claimed is:

1. A chemical heat storage device comprising:
a reaction vessel accommodating a heat storage material;
a heat exchange flow path provided so that a heat-exchange fluid flows along an outer surface of the reaction vessel; and
the chemical heat storage device being configured in such a manner that the reaction vessel is rotated and the heat storage material is agitated, by a flow force of the heat-exchange fluid, wherein
the outer surface of the reaction vessel includes a fin facilitating heat transfer,
the chemical heat storage device is configured in such a manner that the heat-exchange fluid flows while being in contact with the fin at the heat exchange flow path,
the reaction vessel is divided into a plurality of reaction vessel portions, and
the fin is provided at an outer surface of each of the plurality of reaction vessel portions and the reaction vessel portions which are adjacent to each other are connected to each other by the fin; an evaporative condenser recovering water vapor discharged from the heat storage material due to a dehydration reaction at the time of heat storage, the evaporative condenser supplying, to the heat storage material, water vapor performing a hydration reaction with the heat storage material at a time of heat release, and the evaporative condenser being configured to move together with the reaction vessel.

2. The chemical heat storage device according to claim 1, wherein
the heat-exchange fluid corresponds to a high temperature heat-exchange fluid, and
the chemical heat storage device is configured in such a manner that the reaction vessel is rotated and the heat storage material is agitated, by the flow force of the high temperature heat-exchange fluid at a time of heat storage.

3. The chemical heat storage device according to claim 1, further comprising:
a cover member including an inlet port of the heat-exchange fluid and an outlet port of the heat-exchange fluid, and covering the reaction vessel, wherein
the inlet port and the outlet port of the cover member are arranged at sides opposite to each other relative to a position at which the reaction vessel is arranged in the cover member.

4. The chemical heat storage device according to claim 3, wherein
the chemical heat storage device is configured in such a manner that the reaction vessel is rotated and the heat storage material is agitated, by the flow force of the heat-exchange fluid, and
the chemical heat storage device is configured in such a manner that a thickness of an outer shape of each of the reaction vessel portions is tapered towards an outer side in a direction of a radius of rotation and a width of the fin connecting the adjacent reaction vessel portions to each other increases as the radius of rotation increases.

5. The chemical heat storage device according to claim 4, wherein the fin is arranged at a plurality of positions around a rotation center of the reaction vessel.

6. The chemical heat storage device according to claim 1, wherein the chemical heat storage device is configured in such a manner that the reaction vessel is rotated by the flow force of the heat-exchange fluid and the evaporative condenser is rotated in association with rotation of the reaction vessel.

7. The chemical heat storage device according to claim 6, further comprising:
a steam pipe connecting the evaporative condenser and the reaction vessel to each other, wherein
the evaporative condenser is configured to be rotated about the steam pipe serving as a rotation axis together with the rotation of the reaction vessel.

8. The chemical heat storage device according to claim 7, wherein the steam pipe includes a turn back structure restricting a liquid droplet from the evaporative condenser from splashing at the hydration reaction.

9. The chemical heat storage device according claim 1, further comprising: a valve provided between the evaporative condenser and the reaction vessel, and controlling a flow of the water vapor between the evaporative condenser and the reaction vessel.

10. The chemical heat storage device according to claim 1, wherein
the reaction vessel is provided at a vehicle including an internal combustion engine, and
the chemical heat storage device is configured in such a manner that the heat storage by the heat storage material is performed in a manner that the high temperature heat-exchange fluid formed by a high temperature exhaust gas flows along the outer surface of the reaction vessel after completion of warming up of the internal combustion engine of the vehicle and heating of a predetermined portion of the vehicle is performed in a manner that the heat storage material is made to release heat before the completion of the warming up of the internal combustion engine of the vehicle.

11. The chemical heat storage device according to claim 10, wherein the chemical heat storage device is configured in such a manner that heating of a low temperature heat-exchange fluid is performed in a manner that the heat storage material which has stored the heat is made to release the heat before the completion of the warming up of the internal combustion engine of the vehicle, the low temperature heat-exchange fluid being formed by a low temperature exhaust gas before the completion of the warming up and before passing through a catalyst.

* * * * *